United States Patent

[11] 3,552,530

| [72] | Inventors | Alessandro Cortona<br>Banchette;<br>Giuseppe Calano, Mercenasco, Italy |
|------|-----------|---|
| [21] | Appl. No. | 783,864 |
| [22] | Filed | Dec. 16, 1968 |
| [45] | Patented | Jan. 5, 1971 |
| [73] | Assignee | Ing. C. Olivetti & C., S.p.A., Ivrea<br>Turin, Italy<br>a corporation of Italy |
| [32] | Priority | Dec. 19, 1967 |
| [33] |  | Italy |
| [31] |  | No. 54,169/67 |

[54] DOG CLUTCH
3 Claims, 3 Drawing Figs.

[52] U.S. Cl. .................................................. 192/28,
192/71, 192/105
[51] Int. Cl. ................................................. F16d 11/02
[50] Field of Search .......................................... 192/28, 71;
192/103B, 104B, 105B, -11

[56] References Cited
UNITED STATES PATENTS

| 752,741 | 2/1904 | Wilkinson ..................... | 192/28(X) |
| 2,154,575 | 4/1939 | Maurer.................192/105(B-1.1)(X) |
| 2,162,784 | 6/1939 | Neracher...................... | 192/71(X) |
| 2,647,600 | 8/1953 | Anderson..................... | 192/28(X) |

FOREIGN PATENTS

| 158,326 | 11/1932 | Switzerland...................192/105(B-1.1) |

*Primary Examiner*—Allan D. Herrmann
*Attorney*—Birch, Swindler, McKie & Beckett

ABSTRACT: A dog clutch comprising; a rotatable driving member, a ring affixed to the driving member and having a plurality of axially extending teeth integral therewith, a rotatable driven member, and a coupling dog carried by the driven member and being movable radially of the ring for selective engagement between two of the teeth, so that when the coupling dog engages between two of the teeth to connect the driving member to the driven member, centrifugal force urges the coupling dog outwardly radially of the ring and thereby assists in keeping the coupling dog engaged between said two teeth.

PATENTED JAN 5 1971

3,552,530

*INVENTORS*
ALESSANDRO CORTONA
GIUSEPPE CALANO

DOG CLUTCH

BACKGROUND OF THE INVENTION

1. Field of the Invention

The present invention relates to a dog clutch for selectively connecting a rotating driving member to a rotatable driven member, suitable for example for office machines, comprising a toothed or dog ring fixed to the driving member and a coupling dog movable in the radial direction to engage and disengage the clutch.

2. Description of the Prior Art

Various clutches of the aforesaid type are known. The known clutches are generally bulky and therefore unsuitable for being fitted to compact kinematic chains especially for modern office machines. Moreover, in known radial clutches, the coupling dogs move in a centripetal direction to effect the coupling of the driving member to the driven member. At high operating speeds, it may therefore happen that the clutch is disengaged due to the effect of the centrifugal force acting on said dogs. Finally, in known radial clutches, the point of application of the torque to be transmitted is rather close to the axis of rotation of the members to be connected. The elements resisting the stress of the coupling action are therefore necessarily small and consequently very subject to wear. The object of this invention is to overcome such difficulties.

SUMMARY OF THE INVENTION

According to the invention there is provided a dog clutch comprising; a toothed ring fixed to the driving member of the clutch, and a driven member carrying a coupling dog which is movable radially outwardly to engage between two adjacent teeth of the toothed ring, the arrangement being such that, during rotation of the driven member, centrifugal force assists in keeping the coupling dog so engaged.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
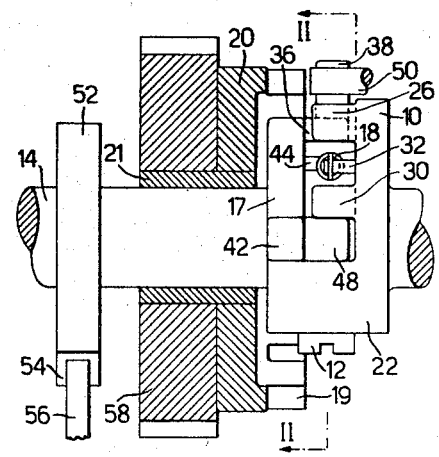
FIG. 1 is a longitudinal view, partly in section of a radial dog clutch embodying the invention.

The radial clutch essentially comprises, a driven member 10 (FIG. 1) fixed by means of a screw 12 to a shaft 14; a slider 16 (FIG. 2) carried by the driven member 10 and including a semicircular annular sector 17 connected to the member 10 by means of a spring 18, and a driving member constituted by a toothed or dog ring 20 fixed on a bushing 21 mounted loosely on the shaft 14. The ring 20 is provided with a series of axially disposed teeth 19. The driven member 10 is provided with two dogs 24 and 26 and with a prismatic guide constituted by a projecting portion 22 and two ribs 28, 30. A stud 32 is fixed to the member 10 in the recess between the dog 26 and the rib 30. The screw 12 is screwed into a corresponding radial hole 34 in the projecting portion 22. The sector 17 is provided with an axial extension 36 (FIG. 1) which is engaged in the recess between the two dogs 24 and 26 of the member 10. The extension 36 carries a lug 38 extending in the radial direction.

Figure 2:
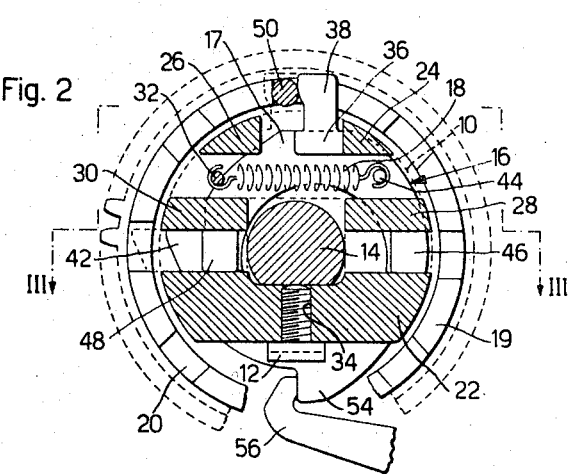
FIG. 2 is a section on the line II–II of FIG. 1.
Figure 3:
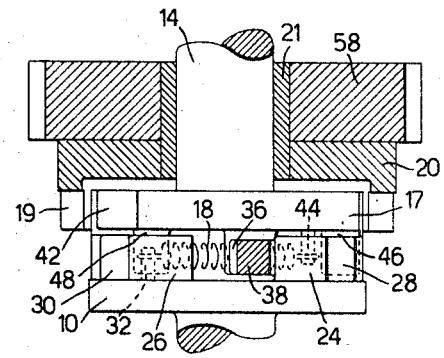
FIG. 3 is a view partly in section on the line III–III of FIG. 2.

The slider 16 is provided with a radial coupling dog 42 at 90° with respect to the extension 36 and which can be engaged in a notch between two adjacent teeth 19 of the ring 20 (FIG. 2). A stud 44 is fixed to and projects axially from the sector 17, the spring 18 being tensioned between the stud 44 and the stud 32 on the member 10. The slider 16 is moreover provided with two guide projections 46 and 48. The projection 46 slides between the rib 28 and the projecting portion 22, while the projection 48 slides between the rib 30 and the projecting portion 22 of the member 10.

An abutment for controlling the clutch, constituted by a pin 50, is adapted to cooperate with the lug 38 to cause the slider 16 to slide on the projecting portion 22 of the member 10. The pin 50 can be shifted radially to release the lug 38 in any well known manner. A check device is provided for preventing rotation of the shaft 14 when the pin 50 stops the lug 38. This device (FIG. 1) comprises a disc 52 keyed on the shaft 14 and provided with a tooth 54, and a pawl 56 adapted to cooperate with the tooth 54 and normally bearing resiliently against the disc 52. A gear 58 fixed to the ring 20 and to the bushing 21 is adapted to be rotated continuously in any well known manner.

The above-described clutch operates in the following manner.

Let the clutch be considered to be initially disengaged, as shown in FIG. 1. The pin 50 is in engagement with the lug 38 and holds the slider 16 shifted in opposition to the action of the spring 18, so that the coupling dog 42 is disengaged from the teeth 19 of the ring 20. The shaft 14 is therefore stationary, while the gear 58 is continuously rotated on the shaft 14 together with the ring 20.

When it is desired to engage the clutch, the pin 50 is shifted radially outwardly so as to be disengaged from the lug 38. The spring 18 returns the slider 16, causing it to slide on the projecting portion 22 until the extension 36 strikes against the dog 26 of the member 10. Consequently, the coupling dog 42 is inserted in a notch between two adjacent teeth 19 of the ring 20, as shown in chain-dotted lines in FIG. 2. The slider 16 is rotated by the ring 20 and transmits the rotary movement to the projecting portion 22 of the member 10, which, being fixed on the shaft 14, causes this shaft also to be rotated by the gear 58. If, at the instant when the slider 16 is released or shifts radially, the coupling dog 42 encounters a tooth 19 of the ring 20, it is temporarily arrested and then shifts into the first notch which is presented in front of it.

When it is desired to terminate the rotation of the shaft 14, the pin 50 is shifted radially downwardly and arrests the lug 38, while the member 10 continues to rotate through inertia together with the shaft 14, overcoming the action of the spring 18. The slider 16 therefore slides by means of the projection 46, between the projecting portion 22 and the rib 28 of the member 10 and by means of the projection 48 between the projecting portion 22 and the rib 30 of said member 10, until the dog 42 is fully disengaged from ring 20 and the extension 36 abuts the dog 24. The pawl 56 is then disposed in front of the tooth 54 of the disc 52, preventing any rebound of the driven part of the clutch.

We claim:

1. A dog clutch comprising:
    a rotatable driving member;
    a ring affixed to said driving member and having a plurality of axially extending teeth integral therewith and disposed adjacent the periphery thereof;
    a rotatable driven member;
    a coupling dog carried by said driven member and being movable radially of said ring from the central portion to the periphery thereof for engagement between two of said teeth to connect the driving member to the driven member;
    an extension integral with said coupling dog;
    a movable abutment selectively engageable with said extension for holding the coupling dog in the central portion of the ring; and
    an elastic means connecting said coupling dog to said driven member for urging the coupling dog radially outwardly of the ring, whereby upon disengagement of the abutment from the extension, centrifugal force assists the elastic means in keeping the coupling dog engaged between two of the teeth.

2. A dog clutch comprising:
    a rotatable driving member;
    a ring affixed to said driving member and having a plurality of axially extending teeth integral therewith and disposed adjacent the periphery thereof;

a rotatable driven member having a prismatic guide formed therein;

a slider slidable in said guide and including a coupling dog movable radially of said ring from the central portion to the periphery thereof for engagement between two of said teeth to connect the driving member to the driven member, said slider further including a semicircular sector-shaped portion having a radial extension displaced substantially 90° from said coupling dog;

a shaft partially encircled by said semicircular sector-shaped portion and connected to one of said driving and driven members;

an abutment movable radially of said semicircular sector-shaped portion and selectively engageable with said extension for holding the coupling dog in the central portion of the ring; and an elastic means connecting said slider to said driven member for urging the coupling dog radially outwardly of the ring, whereby upon disengagement of the abutment from the extension, centrifugal force assists the elastic means in keeping the coupling dog engaged between two of the teeth.

3. A clutch as recited in claim 2 wherein said driven member includes a projecting portion and two ribs integral therewith, said prismatic guide being defined between said projecting portion and ribs; and wherein said slider includes two projections integral therewith, each of said projections being slideable between said projecting portion and one of said ribs.